United States Patent [19]

Hiraka et al.

[11] Patent Number: 5,406,852
[45] Date of Patent: * Apr. 18, 1995

[54] PRESSURE SENSOR HAVING A RESISTOR ELEMENT ON A GLASS DRYER WITH ELECTRODES CONNECTED THERETO

[75] Inventors: Masahiro Hiraka, Ikoma; Handa Haruhiko, Neyagawa; Masaki Ikeda; Akihiko Yoshida, both of Hirakata, all of Japan

[73] Assignee: Matsushita Electric Industrial Co., Ltd., Kadoma, Japan

[*] Notice: The portion of the term of this patent subsequent to Sep. 7, 2010 has been disclaimed.

[21] Appl. No.: 33,269

[22] Filed: Mar. 16, 1993

[30] Foreign Application Priority Data

Mar. 18, 1992 [JP] Japan .................................. 4-061662
Sep. 11, 1992 [JP] Japan .................................. 4-243693

[51] Int. Cl.⁶ .............................................. G01L 9/06
[52] U.S. Cl. ............................................ 73/721; 73/115;
428/34.6; 338/114
[58] Field of Search ......................... 73/115, 720, 721

[56] References Cited

U.S. PATENT DOCUMENTS

| | | | |
|---|---|---|---|
| 3,729,814 | 5/1973 | Wright et al. | 29/577 |
| 4,112,879 | 9/1978 | Assenheimer et al. | 123/32 EA |
| 4,177,524 | 12/1979 | Grell et al. | 3/1.9 |
| 4,342,217 | 8/1982 | Pattow | 73/1 B |
| 4,355,692 | 10/1982 | Ostrelich | 177/211 |
| 4,388,825 | 6/1983 | deValdillieres | 73/115 |
| 4,410,872 | 10/1983 | Stecher et al. | 338/114 |
| 4,499,011 | 2/1985 | Boonstra et al. | 252/518 |
| 4,622,856 | 11/1986 | Binder et al. | 73/721 |
| 4,856,293 | 8/1989 | Takahashi | 62/228.3 |
| 4,916,426 | 4/1990 | Yajima et al. | 338/4 |
| 5,001,454 | 3/1991 | Yamadera et al. | 338/308 |
| 5,092,177 | 3/1992 | Varacca | 73/721 |
| 5,242,722 | 9/1993 | Hiraka et al. | 428/34.6 |

FOREIGN PATENT DOCUMENTS

| | | |
|---|---|---|
| 0321097 | 6/1989 | European Pat. Off. . |
| 2301693 | 2/1976 | France . |
| 2670008 | 6/1992 | France . |
| 2933676 | 3/1981 | Germany . |
| 3919059 | 6/1989 | Germany . |
| 0132327 | 7/1984 | Japan .................................. 73/720 |
| 5-93659 | 4/1993 | Japan .................................. 428/34.6 |

OTHER PUBLICATIONS

European Search Report Appl. 93104450.7 mailed Sep. 12, 1993.

*Primary Examiner*—Thomas P. Noland
*Assistant Examiner*—James M. Olsen
*Attorney, Agent, or Firm*—Renner, Otto, Boisselle & Sklar

[57] ABSTRACT

A pressure sensor including a plate-shaped metal substrate; a glass layer provided on a surface of the metal substrate and mainly containing a partially devitrified enamel composition; a resistor element which is provided on a surface of the glass layer and has an electric resistance changed in accordance with the degree of strain thereof; and a pair of electrodes connected to the resistor element. The resistor element is provided so as to receive a stress, a pressure, or a load applied perpendicularly to a surface thereof. Alternatively, both surfaces of the metal substrate are provided with glass layers, respectively, and the resistor element is provided on one of the glass layers.

29 Claims, 3 Drawing Sheets

PRESSURE SENSOR HAVING A RESISTOR ELEMENT ON A GLASS DRYER WITH ELECTRODES CONNECTED THERETO

BACKGROUND OF THE INVENTION

1. Field of the Invention

The present invention relates to a pressure sensor including a resistor element, the electric resistance of which is changed in accordance with a strain caused by a pressure, stress, or load. In particular, the present invention relates to a pressure sensor for detecting a relatively small pressure of approximately 0 to 2,000 mmH$_2$O or a relatively small load of approximately 0 to 100 g with high accuracy.

2. Description of the Related Art

Pressure sensors are widely used for detecting a stress or load applied to components of machines, ships, and vehicles or for detecting an environmental pressure. In this specification, a pressure sensor will also be referred to as a strain sensor or a strain gauge.

A representative strain sensor includes film formed of a resin such as polyester, epoxy, or polyimide acting as a substrate and a thin-film resistor element formed of a Cu—Ni alloy, a Ni—Cr alloy or the like and provided on the substrate by use of deposition or sputtering. Such a strain sensor is used in the following manner. The substrate thereof is adhered on a surface of the member which receives a stress or load to be measured, using an adhesive resin such as cyanoacrylate. The stress or the load are measured by the strain sensor in the following manner. A degree of strain of the member caused by an external force or load is transmitted to the resistor element through the substrate. Since a cross sectional area of the resistor element and a length of an electrical current path are slightly changed by the strain, the electric resistance of the resistor element is changed. The change in the electric resistance is detected as an electric signal in order to measure the degree of the strain, and the stress and the load applied to the member are detected based on the degree of the strain.

Such a strain sensor is used, for example, as a strain sensor for measuring the load of a suspension for a vehicle. The strain gauge is adhered on a surface of a shaft of the suspension with an adhesive resin or the like in order to detect the load applied on a wheel. Such a usage of the strain gauge as for the suspension, namely, the usage under severe conditions of a temperature range of $-50°$ C. to $150°$ C. and a maximum load of 2 tons for a long period of time has a problem in that the adhering strength of the adhesive resin declines and this causes the strain gauge to be peeled off from the component to be measured.

Researchers including the inventors of the present invention have disclosed a strain sensor for solving the above-mentioned problem in Japanese Patent Application No. 3-282663. This strain sensor includes a pipe-shaped metal substrate, a glass layer formed of a partially devitrified enamel provided on the metal substrate, and a resistor element provided on the glass layer. This strain sensor is incorporated in a shaft of the suspension. The electric resistance of resistor element is changed when the resistor element is strained by stress or load. In the strain sensor, components of the metal substrate and of the glass layer are diffused and mixed with each other at an interface therebetween, and components of the glass layer and the resistor element are diffused and mixed with each other at an interface therebetween. Accordingly, the adhesion between the metal substrate and the glass layer end the adhesion between the glass layer and the resistor element are extremely strong. Since this sensor is of a built-in type, the strain sensor does not peel off from the component even in severe conditions.

Such a strain gauge is used for detecting a load applied on a wheel of a vehicle, namely, a load of approximately 0 to 2 tons. It is difficult to detect a relatively small pressure of approximately 0 to 2,000 mmH$_2$O or a relatively small load of approximately 0 to 100 g with such a strain gauge with high accuracy.

SUMMARY OF THE INVENTION

A pressure sensor according to the present invention includes a plate-shaped metal substrate; a glass layer provided on a surface of the metal substrate and mainly containing a partially devitrified enamel composition; a resistor element which is provided on a surface of the glass layer and has an electric resistance changed in accordance with the degree of strain thereof; and a pair of electrodes connected to the resistor element. The resistor element is provided so as to receive a stress, a pressure, or a load applied perpendicularly to a surface thereof.

Alternatively, the pressure sensor includes a plate-shaped metal substrate; glass layers provided on both surfaces of the metal substrate respectively and mainly containing a partially devitrified enamel composition; a resistor element which is provided on a surface of one of the glass layers and has an electric resistance changed in accordance with the degree of strain thereof; and a pair of electrodes connected to the resistor element.

In a preferred embodiment of the invention, the center of a top surface of the resistor element substantially corresponds to the center of the surface of the metal substrate, and the resistor element and the electrode are each symmetrical with respect to the center thereof.

In a preferred embodiment of the invention, the resistor element and the electrode each have such a shape that provides the resistor element with no directional dependency with respect to pressure or stress.

In a preferred embodiment of the invention, the surface of the resistor element and a top surface of the electrode each have a shape selected from the group consisting of a circular shape, a ring shape, an arc shape, and a polygonal shape.

In a preferred embodiment of the invention, the surface of one of the glass layers is provided with a plurality of the resistor elements and a plurality of the electrodes formed thereon.

In a preferred embodiment of the invention, the surfaces of both of the glass layers are each provided with at least one resistor element and at least a pair of electrodes formed thereon.

In a preferred embodiment of the invention, the partially devitrified enamel composition comprises SiO$_2$ in the range of 7-33 wt. %, B$_2$O$_3$ in the range of 5 to 31 wt. %, MgO in the range of 20 to 50 wt. %, CaO An the range of 0 to 20 wt. %, BaO in the range of 0 to 50 wt. %, La$_2$O$_3$ in the range of 0 to 40 wt. %, P$_2$O$_5$ in the range of 0 to 5 wt. %, and MO$_2$ in the range of 0 to 5 wt. %, where M is one element selected from the group consisting of Zr, Ti and Sn.

In a preferred embodiment of the invention, the electrodes each have a thickness of ½ or less of the thickness of the resistor element.

In a preferred embodiment of the invention, the electrodes contain gold.

In a preferred embodiment of the invention, the resistor element has a length larger than 1.4 times of a length of a space between the electrodes and is formed by removing a projection at a periphery thereof.

In a preferred embodiment of the invention, the resistor element has an average Thickness of 10 $\mu$m or less except for a projection at a periphery thereof.

A pressure detecting apparatus according to the present invention includes a pressure sensor according to the present invention which is provided in an engine manifold of a vehicle. An amount of air inhalated into the manifold is controlled by obtaining a difference between a pressure in the manifold and an atmospheric pressure.

Alternatively, an intake pressure detecting apparatus according to the present invention includes a pressure sensor according to the present invention which is provided on a wall of a combustion chamber of a vehicle engine. A pressure in the combustion chamber is directly detected.

A pressure detecting system according to the present invention for use in a vehicle includes a combination of pressure detecting apparatuses according to the present invention.

Alternatively, an intake pressure detecting apparatus according to the present invention includes a pressure sensor according to the present invention which is provided in a main duct of an air conditioning system. A change in an amount of air in the main duct is detected as a pressure.

Thus, the invention described herein makes possible the advantages of providing (1) a pressure sensor for detecting a relatively small pressure of approximately 0 to 2,000 mmH$_2$O or a relatively small load of approximately 0 to 100 g with high accuracy even in severe conditions, (2) a pressure sensor which has no deviation in the resistance or the TCR (temperature dependent change in resistance) when mass-produced and also is usable in an environment where the temperature dynamically changes, and (3) a pressure sensor having a further improved low TCR.

These and other advantages of the present invention will become apparent to those skilled in the art upon reading and understanding the following detailed description with reference to the accompanying figures.

DESCRIPTION OF THE PREFERRED EMBODIMENTS

Hereinafter, constituting elements of a pressure sensor according to the present invention, a material or composition thereof, and a method for forming the constituting elements will practically be described.

(1) Substrate

A substrate for use in a pressure sensor according to the present invention may be formed of a resin, a glass plate, a metal or an alloy, but preferably of a metal or an alloy for utilizing the advantages of the present invention. In this specification, the term "metal" also refers to an alloy, and a substrate formed of a metal or an alloy will be referred to as a "metal substrate". The metal substrate may be formed of steel for vitreous enamel, stainless steel, silicon steel, an alloy such as Ni—Cr—Fe, Ni—Fe, covar or invar, or a clad of these substances. It is preferable that the material used for the metal substrate and the glass layer formed thereon have nearly equal expansion coefficients to each other. In the case when the glass layer is formed of a non-alkaline partially devitrified enamel as is described below, the material used for the metal substrate preferably has an expansion coefficient of 100 to $140 \times 10^{-7}/° C.$, and more preferably is stainless steel.

The metal substrate may be formed into an arbitrary shape in accordance with the pressure to be applied and the usage. If necessary, the metal substrate may be formed into a desirable shape, may have a hole of a desirable shape, or may be subjected to other processing by use of usual mechanical processing, etching, laser processing or the like.

In order to improve the adhesion between the metal substrate and the glass layer, the metal substrate may be surface-stabilized by degreasing a surface face thereof and then plating the degreased surface with nickel or cobalt, or by heating the surface to form an oxide film.

(2) Glass layer

The glass layer is preferably formed of a material which is excellent in electric insulation and heat resistance, for example, a non-alkaline partially devitrified enamel composition. When the non-alkaline devitrified enamel composition is sintered and cooled, a MgO partially devitrified crystalline phase is deposited, for example. The non-alkaline partially devitrified enamel used for the glass layer may have various compositions. Preferred compositions include MgO in 20 to 50 wt. %, $SiO_2$ in 7 to 33 wt. %, $B_2O_3$ in 5 to 31 wt. %, BaO in 0 to 50 wt. %, $La_2O_3$ in 0 to 40 wt. %, CaO in 0 to 20 wt. %, $P_2O_5$ in 0 to 5 wt. %, and $MO_2$ in 0 to 5 wt. % (where M is at least one element selected from the group consisting of Zr, Ti, and Sn).

One of the reasons why a partially devitrified enamel is preferred as a material for the glass layer is that this material provides a strong adhesion between the metal substrate and the glass layer. The partially devitrified enamels having the above-mentioned compositions have an especially strong adhesion with the metal substrate.

Another reason for the preference for partially devitrified enamel is that this material provides the glass layer with a resistance against high temperatures. In the case when a resistor element is formed on the glass layer by sintering, a high temperature is required. Accordingly, the glass layer should have a resistance against a temperature of at least 900° C. A partially devitrified enamel composition is resistant against a temperature of approximately up to 650° C. because it is not crystallized, but a partially devitrified enamel is resistant against a temperature of at least 900° C. The glass layer formed of the partially devitrified enamel is not fluidized even at a temperature of 900° C. Due to such a property, the glass layer is not strained even when the resistor element is formed by sintering at a temperature of 850° C. In contrast, ordinary non-crystalline glass is not crystallized and thus has a poor temperature resistance. Since such ordinary glass is fluidized at a temperature of as low as 600° C., the resistor element cannot be formed by sintering at a temperature of 850° C., or the components of the glass layer and of the resistor element are mixed with each other so as to change the properties of the resistor element.

The glass layer is formed on the metal substrate by a usual method of spraying, electrosatic powder enameling, electric phorefic enameling, or the like. Electric phorefic enameling is preferable since this method provides an excellent adhesion between the metal substrate and the glass layer, high electric insulation, and the like.

The glass layer is formed on the metal substrate by use of electric phorefic enameling in the following manner.

First, glass, alcohol, and a small amount of water are powdered and mixed for 20 hours in a bowl mill to obtain an average grain size of glass of 1 to 5 $\mu m$. The resultant slurry is put into an electrolytic vessel and circulated. Next, the metal substrate is immersed in the slurry as a cathode and polarized at a voltage of 100 to 400 V, thereby allowing glass particles to be deposited on a surface of the metal substrate. Then, the resultant metal substrate is dried and then sintered at a temperature of 850° to 900° C. for 10 minutes to 1 hour. By this sintering, the glass particles are melted, and simultaneously the components of the glass and of the metal substrate are sufficiently diffused and mixed with each other. As a result, a satisfactory adhesion between the glass layer and the metal substrate can be obtained.

In the case when the above-mentioned sintering is performed while gradually raising the temperature from room temperature to a desired temperature, a great number of fine needle crystals are deposited. Such crystals provide an anchor effect, and simultaneously the adhesion between the glass layer and the metal substrate is improved, which is more preferable.

(3) Resistor element

For a resistor element, various materials may be used, the electric resistance of which is changed in accordance with the degree of strain. For example, a metal such as nickel, chrome, copper, iron, or ruthenium, an alloy such as a Cu—Ni alloy or a Ni—Cr alloy, or a metal oxide such as ruthenium oxide may be used.

The resistor element is formed by printing, plating (non-electric plating, transfer printing or the like as is described below.

According to one of the printing methods, the resistor element is formed on the glass layer in the following manner. First, a paste containing an organic metal compound mainly containing one of Bi, Rh, V and Sb is formed. The paste is printed on a surface of the glass layer, and then is subjected to thermal decomposition. Thus, a metal film or an alloy film is obtained so as to act as a resistor element. The paste used for this method preferably contains a metal selected from the group consisting of nickel, chrome, copper, iron, and ruthenium, and further at least two types of thermally decomposable organic compounds containing one of Bi, Rh, V, and Sb as additives.

According to another printing method, the resistor element is formed on the glass layer in the following manner. First, a paste containing rethenium oxide and glass frit such as borosilicate glass as main components is formed. The paste is printed on the glass layer and then sintered. The paste preferably contains a filler ($ZrO_2$ or the like), bismuth oxide, ethyl cellulose, acetate ester of butylcarbitol (or terpineol) and the like in addition to the above-mentioned main components.

For forming a resistor element by non-electric plating, an assembly of the metal substrate and the glass layer is immersed in a plating liquid. The plating liquid includes a metal complex and a reducing agent such as hypophosphorous acid. The metal complex may contain a metal complex such as Cu—Ni—P, Ni—Cr—P, or Ni—Fe—P. These materials are satisfactory in sensitivity to strain and resistance against high temperatures and thus are suitable for use as a pressure sensor for detecting a relatively small pressure or a pressure sensor used under the environment where temperature is dynamically changed.

Electrons released by oxidation of the reducing agent reduces metal ions in the metal complex to allow the metal deposited on a surface which is to be plated. A general reaction occurring in the case when Ni is deposited is expressed by Scheme I.

When the surface to be plated is a metal, metal ions in the plating liquid and the ions of the surface to be plated are first substituted at an initial stage of immersion, and then reduction occurs. Since the atoms of the plating metal deposited on the surface act as an auto-catalyst thereafter, reduction of the plating metal smoothly progresses.

When the surface to be plated is an insulating material, the ion substitution does not occur at an initial stage of immersion. In this case, by absorbing Sn ions of tin chloride and Pd ions of palladium chloride to the insulating material in advance, the ion substitution occurs at an initial stage of immersion and then the reduction occurs. Thereafter, the metal deposited on the surface acts as an auto-catalyst as in the case when the surface to be plated is a metal, thereby progressing the reduction.

The non-electric plating is preferable for producing a pressure sensor including a glass layer formed of a partially devitrified enamel for the following reason. The glass layer formed of a partially devitrified enamel has fine needle crystals on a surface thereof, and thus is porous. When such a glass layer is plated, reduction starts in an inner portion of the glass layer. The resulting plating layer provides an anchor effect, thereby improving the adhesion between the plating layer and the glass layer. In contrast, a usual non-crystalline glass layer or a plastic layer has a smooth surface. Since no anchor effect is provided by the smooth surface, the adhesion thereof with the plating layer is poor.

It is preferable to provide a catalyst layer including tin, palladium or the like on a surface of the glass layer in advance and then form the resistor element on a surface of the catalyst layer. Thus, a better anchor effect is obtained, thereby the adhesion between the glass layer and the resistor element is greatly improved.

After a resistor element is formed by any of the above-mentioned methods, it is preferable to process the resistor element to a fine pattern. A resistor element formed by non-electric plating can be processed either by:

Method (1) The resistor element is cut into a specified pattern by laser, or

Method (2) By photolithography, unnecessary portions of the resistor element is removed. It is also possible to form a resistor element by non-electric plating in combination with a lift-off process which uses a plating condition-resistive resist having an excellent resistance against a plating liquid which is a strong acid or a strong alkali and used under a high temperature of 80° to 95° C. The plating condition-resistive resist is preferably formed of a UV-curable acrylic resin having a satisfactory printability and a short curing time.

For forming a resistor element by transfer printing, a foil of a Cu—Ni alloy or a Ni—Cr alloy is preferably used. According to this method, one of the surfaces of the foil is coated with a resin, and then a resist is painted on the other surface of the foil. Then, etching is performed so as to obtain a resistor element in a specified pattern. The resultant resistor element is fixed on the glass layer on the metal substrate with the resin, and then sintered.

The pattern is transferred on the glass layer with high accuracy by using the resin for fixing the resistor element. The resin is solved in an appropriate solvent and adjusted so as to have a desirable viscosity prior to being sprayed or printed on the foil. Alternatively, a layer of the resin is laminated on the foil. The resin is removed by sintering. Preferable resins include acrylic resins such as polyacrylate and polymethacrylate, vinyl chloride, a copolymer of vinyl chloride and polyacrylate, and the like. Such resins are excellent in combustibility and do not have any adverse affect on the glass layer or the alloy foil. Further, since a degree of shrinkage due to the heat is small, these resins assist the transfer of the pattern of the foil with high accuracy.

The printing, the plating, and the transfer printing methods are easy and low-cost methods for forming a resistor element on a glass layer which are also suitable for mass production.

(4) Electrode

An electrode is prepared by printing a paste formed of various metals and a glass paste on a surface of the glass layer and sintering the glass layer with the paste. As the glass paste, a Ag—Pd or an Ag glass paste can be used. As the paste formed of metals, a paste including an organic metal compound mainly containing Au as a conducting component and at least two types of thermally decomposable organic compounds containing one of Si, Bi, Rh, V, and Sb as additives is preferable. In addition to Au, an organic metal compound containing Pd can arbitrarily be added as a conducting component.

Electrodes connected to the resistor element may be formed in various conventional methods before, after, or simultaneously with the formation of the resistor element.

If necessary, an overcoating layer of glass or a resin may be formed on the resistor element.

A pressure sensor is used in various ways in accordance with an object for measurement. Some examples will be described, hereinafter.

(1) For detecting a load or a stress of approximately 0 to 2 tons applied to a wheel of an automobile, a pressure sensor is adhered on a shaft or other parts which receives the load and is strained. In this way, the strain transmitted to the pressure sensor can indirectly be detected. In this case, since the pressure sensor only indirectly receives the stress, the pressure sensor can withstand even a relatively large stress. Although the glass layer used in the pressure sensor is fragile against a tensile stress, the part of the object on which the pressure sensor is adhered shrinks in this case. Accordingly, the pressure sensor receives a compressive stress, and thus can withstand even a relatively large stress.

(2) For detecting an environmental pressure, a pressure sensor is attached to a material in an environment to be measured. Since the pressure is uniformly applied to the pressure sensor from all directions, the sensor is relatively highly resistant against breakage.

Figure 2:
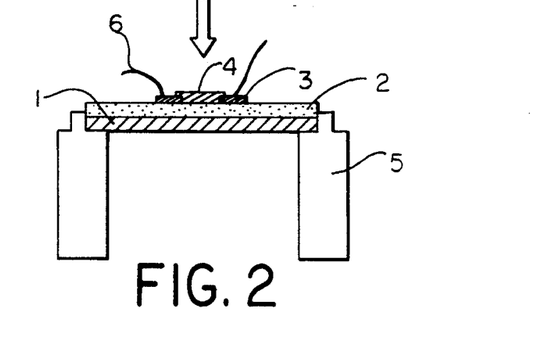
FIG. 2 is a view illustrating a method for measuring a change in the resistance of a pressure sensor according to the present invention by applying a load thereto.
Figure 3:
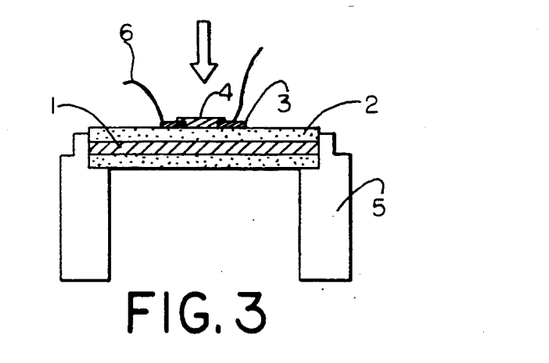
FIG. 3 is a view illustrating a method for measuring a change in the resistance of a pressure sensor according to a comparative example by applying a load thereto.
Figure 4:
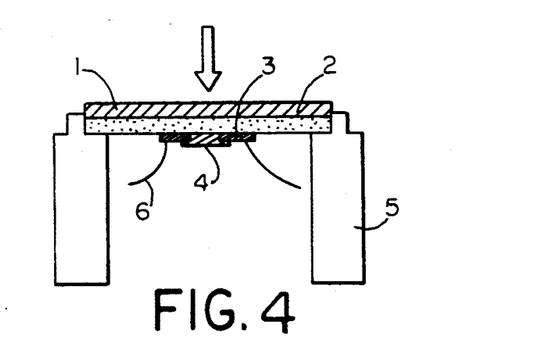
FIG. 4 is a view illustrating a method according to a comparative example for measuring a change in the resistance of a pressure sensor by applying a load thereto.

(3) For directly detecting a load, a pressure sensor is arranged so as to directly receive the load as is shown in FIGS. 2 or 3. In this case, since the whole load is directly applied to the resistor element of the pressure sensor, even a small load of several hundred grams is sufficient to break the pressure sensor.

Since a pressure sensor according to the present invention is used in different ways in different examples, a pressure sensor which is not appropriate to an example is considered to be satisfactory in another example. In the usage of (2), since a stress or a pressure is directly applied to the resistor element, the center of the metal substrate or a glass layer is not required to correspond to the center of the resistor element. However, in the usages of (1) and (3), the center of the metal substrate or the glass layer is required to correspond to the center of the resistor element.

Hereinafter, the present invention will be described by way of illustrating examples with reference to the accompanying drawings.

EXAMPLE 1

On a surface of a metal substrate formed of SUS430 (100 mm × 100 mm × 0.5 mm), a glass layer formed of a partially devitrified enamel having each of the compositions shown in Tables 1 through 5 was formed in a thickness of 100 μm, and was sintered a temperature of 880° C. for 10 minutes. Samples thus obtained were evaluated for surface properties of the glass layer such as surface roughness and surface winding, heat resistance of the glass layer, adhesion between the metal substrate and the glass layer (also referred to simply as "adhesion"). The results are also shown in Tables 1 through 5.

The surface roughness was measured by a Talysurf surface roughness meter and shown by Ra, an average roughness at a central line of the surface. A smaller value of Ra is more preferable. The surface winding is shown by Rmax, the maximum difference between a peak with a maximum height and a trough with a minimum height measured by the Talysurf surface roughness meter. A smaller value of Rmax is more preferable.

In order to find out the heat resistance, a spalling test was repeated in which the samples were kept in an electric oven at a temperature of 850° C. for 10 minutes and then naturally cooled outside the oven for 30 minutes. Abnormalities such as cracks and peelings-off generated in the samples were examined. The cracks were visually checked after the samples were immersed in a red ink, taken out of the ink, and then the ink on the surface was wiped off. In Tables 1 through 5, ○ indicates no abnormality was generated after 10 cycles of the spalling test; Δ indicates an abnormality was generated after 5 to 9 cycles; and X indicates an abnormality was generated after 4 cycles or less.

The adhesion was examined by bending the samples. In Tables 1 through 5, X indicates the glass layer was peeled off so as to expose the surface of the metal substrate; Δ indicates the surface of the metal substrate was partially exposed; and ○ indicates the surface of the metal substrate was not exposed.

TABLE 1

| Sample No. | 1 | 2 | 3 | 4 | 5 | 6 | 7 | 8 | 9 |
|---|---|---|---|---|---|---|---|---|---|
| Composition (wt. %) | | | | | | | | | |
| MgO | 39 | 39 | 39 | 39 | 39 | 39 | 39 | 39 | 10 |
| BaO | 12 | 12 | 12 | 12 | 12 | 12 | 12 | 12 | 10 |
| CaO | 3 | 3 | 3 | 3 | 3 | 3 | 3 | 3 | 3 |
| $La_2O_3$ | 5 | 5 | 5 | 5 | 5 | 5 | 5 | 5 | 5 |
| $B_2O_3$ | 0 | 5 | 10 | 15 | 25 | 30 | 31 | 33 | 46 |
| $SiO_2$ | 38 | 33 | 28 | 23 | 13 | 8 | 7 | 5 | 23 |
| $ZrO_2$ | 2 | 2 | 2 | 2 | 2 | 2 | 2 | 2 | 2 |
| $TiO_2$ | | | | | | | | | |
| $SnO_2$ | | | | | | | | | |
| $P_2O_5$ | 1 | 1 | 1 | 1 | 1 | 1 | 1 | 1 | 1 |
| ZnO | | | | | | | | | |
| $SiO_2/B_2O_3$ ratio | ∞ | 6.6 | 2.8 | 1.53 | 0.52 | 0.27 | 0.22 | 0.15 | 0.50 |
| Surface roughness (μm) | 0.6 | 0.5 | 0.46 | 0.38 | 0.05 | 0.06 | 0.06 | 0.08 | 0.09 |
| Winding (μm) | 5.2 | 3.3 | 3.2 | 2.5 | 0.5 | 1.0 | 1.0 | 0.9 | 1.2 |
| Heat resistance | ○ | ○ | ○ | ○ | ○ | ○ | ○ | X | X |
| Adhesion | ○ | ○ | ○ | ○ | ○ | ○ | ○ | ○ | ○ |
| Overall evaluation | X | ○ | ○ | ○ | ○ | ○ | ○ | X | X |

TABLE 2

| Sample No. | 10 | 11 | 12 | 13 | 14 | 15 | 16 | 17 | 18 |
|---|---|---|---|---|---|---|---|---|---|
| Composition (wt. %) | | | | | | | | | |
| MgO | 10 | 20 | 29 | 40 | 50 | 55 | 40 | 40 | 40 |
| BaO | 10 | 10 | 10 | 10 | 10 | 10 | 5 | 5 | 5 |
| CaO | 3 | 3 | 3 | 3 | 3 | 3 | | 10 | 20 |
| $La_2O_3$ | 5 | 5 | 5 | 5 | 5 | 5 | 5 | 5 | 5 |
| $B_2O_3$ | 42 | 39 | 33 | 26 | 19 | 16 | 31 | 25 | 18 |
| $SiO_2$ | 21 | 20 | 17 | 13 | 10 | 8 | 16 | 12 | 9 |
| $ZrO_2$ | 2 | 2 | 2 | 2 | 2 | 2 | 2 | 2 | 2 |
| $TiO_2$ | | | | | | | | | |
| $SnO_2$ | | | | | | | | | |
| $P_2O_5$ | 1 | 1 | 1 | 1 | 1 | 1 | 1 | 1 | 1 |
| ZnO | | | | | | | | | |
| $SiO_2/B_2O_3$ ratio | 0.50 | 0.51 | 0.52 | 0.5 | 0.53 | 0.5 | 0.52 | 0.48 | 0.5 |
| Surface roughness (μm) | 0.08 | 0.07 | 0.05 | 0.07 | 0.10 | 0.18 | 0.08 | 0.05 | 0.09 |
| Winding (μm) | 1.1 | 0.5 | 0.9 | 0.5 | 0.8 | 1.5 | 0.2 | 0.6 | 0.9 |
| Heat resistance | ○ | ○ | ○ | ○ | ○ | ○ | ○ | ○ | ○ |
| Adhesion | ○ | ○ | ○ | ○ | ○ | Δ | ○ | ○ | ○ |
| Overall evaluation | ○ | ○ | ○ | ○ | ○ | X | ○ | ○ | ○ |

TABLE 3

| Sample No. | 19 | 20 | 21 | 22 | 23 | 24 | 25 | 26 | 27 |
|---|---|---|---|---|---|---|---|---|---|
| Composition (wt. %) | | | | | | | | | |
| MgO | 40 | 20 | 20 | 20 | 20 | 20 | 30 | 30 | 30 |
| BaO | 5 | | 20 | 40 | 50 | 60 | 5 | 5 | 5 |
| CaO | 25 | 2 | 2 | 2 | 2 | 2 | 2 | 2 | 2 |
| $La_2O_3$ | 5 | 5 | 5 | 5 | 5 | 5 | 5 | 10 | 30 |
| $B_2O_3$ | 15 | 47 | 33 | 20 | 13 | 7 | 40 | 33 | 20 |
| $SiO_2$ | 7 | 23 | 17 | 10 | 7 | 3 | 20 | 17 | 10 |
| $ZrO_2$ | 2 | 2 | 2 | 2 | 2 | 2 | 2 | 2 | 2 |
| $TiO_2$ | | | | | | | | | |
| $SnO_2$ | | | | | | | | | |
| $P_2O_5$ | 1 | 1 | 1 | 1 | 1 | 1 | 1 | 1 | 1 |
| ZnO | | | | | | | | | |
| $SiO_2/B_2O_3$ ratio | 0.47 | 0.49 | 0.52 | 0.5 | 0.54 | 0.43 | 0.5 | 0.52 | 0.5 |
| Surface roughness (μm) | 0.14 | 0.09 | 0.08 | 0.06 | 0.05 | 0.05 | 0.10 | 0.08 | 0.08 |
| Winding (μm) | 1.5 | 0.9 | 0.6 | 0.6 | 0.5 | 0.5 | 1.1 | 0.9 | 0.9 |
| Heat resistance | ○ | ○ | ○ | ○ | Δ | X | ○ | ○ | ○ |
| Adhesion | Δ | ○ | ○ | ○ | Δ | Δ | ○ | ○ | ○ |
| Overall evaluation | X | ○ | ○ | ○ | Δ | X | ○ | ○ | ○ |

TABLE 4

| Sample No. | 28 | 29 | 30 | 31 | 32 | 33 | 34 | 35 | 36 |
|---|---|---|---|---|---|---|---|---|---|
| Composition (wt. %) | | | | | | | | | |
| MgO | 30 | 30 | 40 | 40 | 40 | 40 | 40 | 40 | 40 |
| BaO | 5 | 5 | 10 | 10 | 10 | 10 | 10 | 10 | 10 |
| CaO | 2 | 2 | 3 | 3 | 3 | 3 | 3 | 3 | 3 |
| $La_2O_3$ | 40 | 45 | 5 | 5 | 5 | 5 | 5 | 5 | 5 |
| $B_2O_3$ | 13 | 7 | 27 | 24 | 23 | 27 | 24 | 23 | 27 |
| $SiO_2$ | 7 | 3 | 14 | 12 | 11 | 14 | 12 | 11 | 14 |
| $ZrO_2$ | 2 | 2 | | 5 | 7 | | | | |
| $TiO_2$ | | | | | | | 5 | 7 | |
| $SnO_2$ | | | | | | | | | |
| $P_2O_5$ | 1 | 1 | 1 | 1 | 1 | 1 | 1 | 1 | 1 |
| ZnO | | | | | | | | | |
| $SiO_2/B_2O_3$ ratio | 0.54 | 0.43 | 0.52 | 0.5 | 0.49 | 0.52 | 0.5 | 0.49 | 0.52 |
| Surface roughness (μm) | 0.07 | 0.06 | 0.05 | 0.08 | 0.12 | 0.05 | 0.08 | 0.13 | 0.05 |
| Winding (μm) | 0.9 | 0.8 | 0.5 | 0.9 | 1.5 | 0.5 | 1.0 | 1.6 | 0.6 |
| Heat resistance | Δ | X | ○ | ○ | ○ | ○ | ○ | ○ | ○ |
| Adhesion | ○ | ○ | ○ | ○ | ○ | ○ | ○ | ○ | ○ |
| Overall evaluation | Δ | X | ○ | ○ | X | ○ | ○ | X | ○ |

TABLE 5

| Sample No. | 37 | 38 | 39 | 40 | 41 | 42 |
|---|---|---|---|---|---|---|
| Composition (wt. %) | | | | | | |
| MgO | 40 | 40 | 40 | 40 | 40 | 40 |
| BaO | 10 | 10 | 10 | 10 | 10 | 10 |
| CaO | 3 | 3 | 3 | 3 | 3 | 3 |
| $La_2O_3$ | 5 | 5 | 5 | 5 | 5 | 5 |
| $B_2O_3$ | 24 | 23 | 28 | 24 | 23 | 27 |
| $SiO_2$ | 12 | 11 | 14 | 12 | 11 | 14 |
| $ZrO_2$ | | | | | | |
| $TiO_2$ | | | | | | |
| $SnO_2$ | 5 | 7 | | | | |
| $P_2O_5$ | 1 | 1 | 1 | 1 | 1 | 1 |
| ZnO | | | | 5 | 7 | |
| $SiO_2/B_2O_3$ ratio | 0.5 | 0.49 | 0.5 | 0.5 | 0.49 | 0.52 |
| Surface roughness (μm) | 0.09 | 0.12 | 0.06 | 0.08 | 0.13 | 0.05 |
| Winding (μm) | 0.9 | 1.6 | 0.7 | 1.0 | 1.6 | 0.6 |
| Heat resistance | ○ | ○ | ○ | ○ | ○ | ○ |
| Adhesion | ○ | ○ | ○ | ○ | ○ | ○ |
| Overall evaluation | ○ | X | ○ | ○ | X | ○ |

Samples 1 through 8 have different amounts of $SiO_2$ and $B_2O_3$ with the amounts of the other components being identical with one another.

Samples 9 through 15 have different amounts of MgO with the $SiO_2/B_2O_3$ ratio substantially identical with one another.

Samples 16 through 19 have different amounts of CaO with the $SiO_2/B_2O_3$ ratio substantially identical with one another.

Samples 20 through 24 have different amounts of BaO with the $SiO_2/B_2O_3$ ratio substantially identical with one another.

Samples 25 through 29 have different amounts of $La_2O_3$ with the $SiO_2/B_2O_3$ ratio substantially identical with one another.

Samples 30 through 42 have different amounts of $ZrO_2$, $TiO_2$, $SnO_2$ or ZnO with the $SiO_2/B_2O_3$ ratio substantially identical with one another.

$SiO_2$ and $B_2O_3$ are oxides which form the basic framework of glass. MgO, BaO and CaO, which are referred to as network modifier oxide, significantly influence the melting point and the crystallinity of glass. $La_2O_3$ improves the adhesion between the metal substrate and the glass layer. $ZrO_2$, $TiO_2$, $SnO_2$, or $P_2O_5$ forms a core of a crystal.

As is apparent from Tables 1 through 5, a sample having a high $SiO_2$ content is strong in heat resistance but poor in surface properties and adhesion. Needless to say, a sample having a low $SiO_2/B_2O_3$ ratio is poor in heat resistance but good in surface properties and adhesion. According to the present invention, the material for the glass layer preferably contains $SiO_2$ in the range of 7 to 33 wt. % and $B_2O_3$ in the range of 5 to 31 wt. %, with a preferable $SiO_2/B_2O_3$ ratio of 0.22 to 6.6.

The amount of MgO is relevant to a degree of devitrification. When MgO is contained in less than 20 wt. %, crystal deposition is insufficient, thereby deteriorating the heat resistance of the glass layer. When MgO is contained in more than 50 wt. %, crystals are easily deposited when the glass is melted. In such a case, the glass hardly obtains a uniform quality, and further have a high surface roughness and a poor adhesion. Accordingly, MgO is preferably contained in the range of 20 to 50 wt. %.

When CaO is contained in more than 20 wt. %, the glass layer has poor surface properties, but when CaO is contained in 20 wt. % or less, there is no adverse affect. Accordingly, CaO is preferably contained in 0 to 20 wt. %.

When BaO is contained in more than 50 wt. %, the heat resistance of the glass layer and the adhesion are deteriorated, but when BaO is contained in 50 wt. % or less, there is no adverse affect. Accordingly, BaO is preferably contained in 0 to 50 wt. %.

When $La_2O_3$ is contained in more than 40 wt. %, the heat resistance of the glass layer deteriorates, but when $La_2O_3$ is contained in 40 wt. % or less, there is no adverse affect. Accordingly, $La_2O_3$ is preferably contained in 0 to 40 wt. %.

Although all the samples contains $P_2O_5$ in an identical amount in Example 1, it has been confirmed that desirable properties are obtained when $P_2O_5$ is obtained in 0 to 5 wt. %. When $P_2O_5$ is contained in more than 5 wt. %, the surface properties deteriorate.

Other components which may be added, namely, $ZrO_2$, $TiO_2$, $SnO_2$, and ZnO are each preferably contained in 0 to 5 wt. %. When these components are each contained in more than 5 wt. %, the surface properties deteriorate.

EXAMPLE 2

Figure 1A:
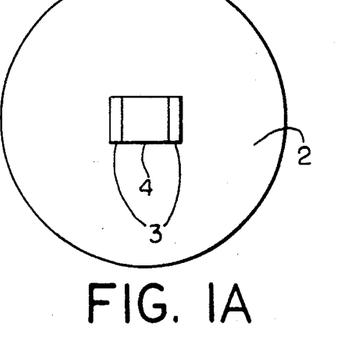
FIG. 1A is a plan view of a pressure sensor according to an example of the present invention.
Figure 1B:
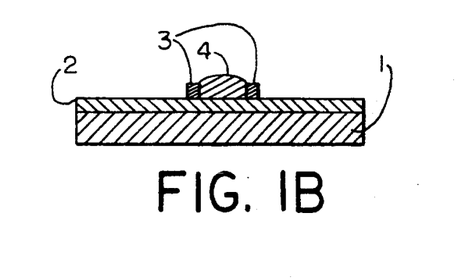
FIG. 1B is a cross sectional view of the pressure sensor shown in FIG. 1A.

A pressure sensor according to the present invention produced by any of the general methods described in the introductory part of the description of the preferred embodiments will be described with reference to FIGS. 1A and 1B.

A plate-shaped metal substrate 1 having an outer diameter of 40 mm and a thickness of 60 $\mu$m was pretreated by degreasing, rinsing, acid washing, rinsing, nickel plating, and then rinsing. The resultant metal substrate 1 was immersed in a slurry containing the partially devitrified enamel particles having the composition of Sample 7 in Table 1, and a voltage was directly applied between a counter electrode and the metal substrate 1 so as to coat the metal substrate 1 with the glass particles, by use of the above-mentioned electric phorefic enameling. The temperature was raised from room temperature to 880° C. in 4 hours, and the resultant metal substrate 1 coated with the glass particles was sintered at this temperature for 10 minutes, thereby forming a glass layer 2 of the partially devitrified enamel. A Ag—Pd paste was printed in a specified pattern on a surface of the glass layer 2, and then sintered at a temperature of 850° C., thereby forming a pair of electrodes 3. A paste mainly including ruthenium oxide and glass frit was printed in a specified pattern between the electrodes 3, and then sintered at a temperature of 830° C., thereby forming a resistor element 4. Thus, a pressure sensor according to the present invention was produced. FIG. 1A is a plan view of the resultant pressure sensor, and FIG. 1B is a cross sectional view thereof.

EXAMPLE 3

Another pressure sensor was produced in the same manner as in Example 2 except that a metal foil having a thickness of 200 $\mu$m was used instead of the plate-shaped metal substrate 1.

Comparative Example 1

A glass layer was formed on both surfaces of a metal foil having a thickness of 60 $\mu$m instead of on the plate-shaped metal substrate 1, and then a resistor element which is identical with the one in Example 2 was formed on one of the surfaces of the glass layer, thereby producing a pressure sensor as a comparative example.

EXAMPLE 4

As is shown in FIG. 2, the pressure sensors produced in Examples 2 and 3 were each fixed on a fixing table 5 so that a load would be applied perpendicularly to a surface of the resistor element 4. The electrodes 3 each had a lead wire 6 connected thereto so that the resistance of the resistor element 4 could be measured.

As is shown in FIG. 3, the pressure sensor produced in Comparative Example 1 was fixed on the fixing table 5 so that a load would be applied perpendicularly to a surface of the resistor element 4.

Comparative Example 2

As Comparative Example 2, the pressure sensor produced in Example 2 was fixed on the fixing table 5 so that a load would be applied perpendicularly to a surface of the pressure sensor opposite to the surface on which the resistor element 4 is formed.

The sensors according to Examples 2 and 3 and Comparative Examples 1 and 2 were applied with weights of 500 mg, 1 g, 5 g, 10 g, and 50 g, and evaluated for a change ratio in the resistance. The results are shown in Table 6.

TABLE 6

| | Load versus change ratio in the resistance (%) | | | | |
|---|---|---|---|---|---|
| | 500 mg | 1 g | 5 g | 10 g | 50 g |
| Example 2 | 0.010 | 0.018 | 0.088 | 0.174 | 0.877 |
| Example 3 | 0.002 | 0.004 | 0.021 | 0.040 | 0.213 |
| Comparative Example 1 | 0.007 | 0.014 | 0.069 | 0.136 | crack |
| Comparative Example 2 | — | — | 0.005 | 0.011 | 0.053 |

When a load in the range of 500 mg to 50 g was applied to the pressure sensors according to Examples 2 and 3, the change ratio in the resistance of each pressure sensor was linearly changed. This fact means that a relatively small load or pressure can be measured. No crack or peeling-off was generated in the glass layers 2 of the pressure sensors according to Examples 2 and 3.

In the pressure sensor according to Comparative Example 1, cracks were generated in the lower glass layer 2 by a load of 50 g since a tensile stress was applied to the lower glass layer 2 by the load.

The pressure sensor according to Comparative Example 2 did not detect a load of 5 g or less, and cracks were generated in the glass layer 2 by a load of 100 g or more, since a tensile stress was applied to the glass layer 2 by the load. In contrast, in the case when the pressure sensor which is identical with the one according to the Comparative Example 2 is provided in such a manner that a load is applied glass layer 2 on the metal substrate 1 as is shown in FIG. 2, the glass layer 2 receives only a compressive stress but not a tensile stress.

Since the pressure sensors according to Examples 2 and 3 each have a high sensitivity, as is apparent from the above experiment, these pressure sensors can be used as sensors for detecting the vapor pressure of a liquid. In the experiment described in Example 4, for example, a load of 1.7 g corresponds to a vapor pressure of 1 mmHg.

EXAMPLE 5

Figure 5A:
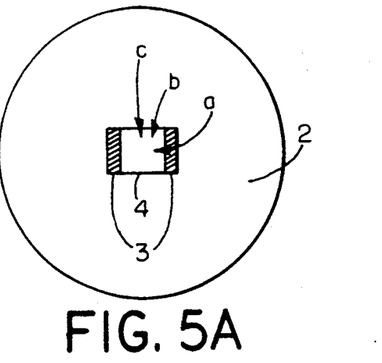
FIG. 5A is a plan view of a pressure sensor according to another example of the present invention.
Figure 5B:
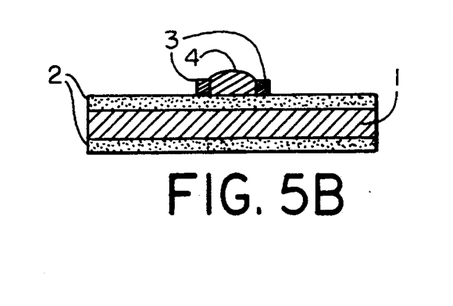
FIG. 5B is a cross sectional view of the pressure sensor shown in FIG. 5A.

Yet another pressure sensor was produced in the same manner as in Example 2 except that the glass layers 2 were formed on both surfaces of the metal substrate 1. It should be noted that the resistor element 4 was formed within 1.5 mm from the center of the metal substrate 1 so that the center of the resistor element 4 corresponds to the center of the metal substrate 1. FIG. 5A is a plan view of the pressure sensor according to Example 5, and FIG. 5B is a cross sectional view thereof.

EXAMPLE 6

Figure 6:
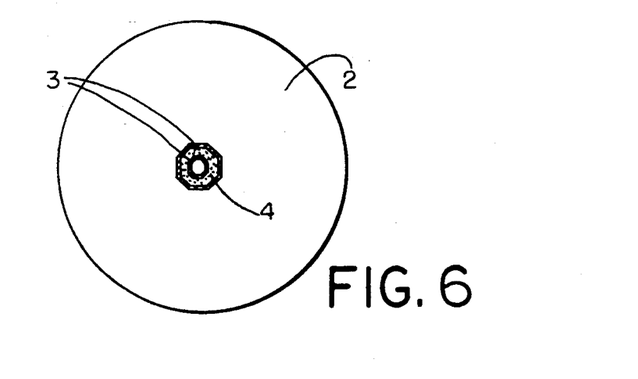
FIG. 6 is a plan view of a pressure sensor according to yet another example of the present invention.

Yet another pressure sensor was produced in the same manner as in Example 5 except that a resistor element 4 and electrodes 3 both having a shape of a regular octagon were formed within 1.5 mm from the center of the metal substrate 1 as is shown in FIG. 6. The center of the resistor element 4 corresponds to the center of the metal substrate 1.

EXAMPLE 7

Figures 7, 8, 9, 10, 12:
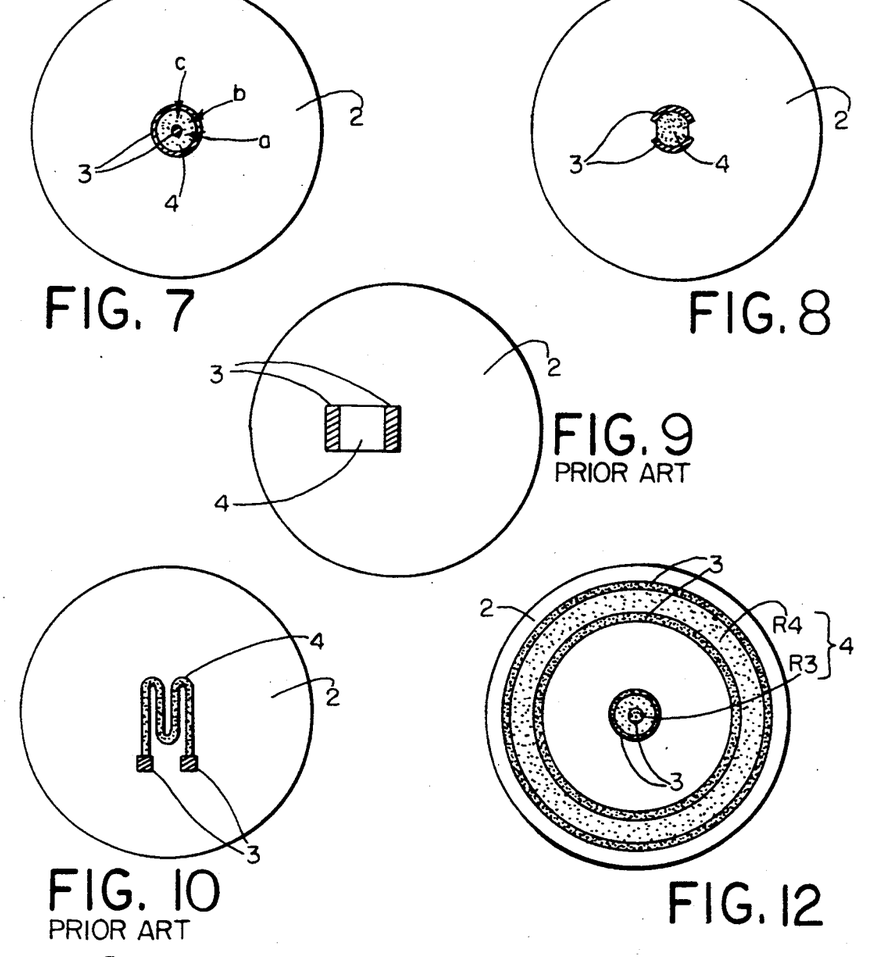
FIG. 7 is a plan view of a pressure sensor according to yet another example of the present invention.
FIG. 8 is a plan view of a pressure sensor according to yet another example of the present invention.
FIG. 9 is a plan view of a pressure sensor according to a comparative example.
FIG. 10 is a plan view of a pressure sensor according to another comparative example.
FIG. 12 is a plan view of a pressure sensor according to yet another example of the present invention.

Yet another pressure sensor was produced in the same manner as in Example 5 except that a resistor element 4 and electrodes 3 both having a circular shape were formed within 1.5 mm from the center of the metal substrate 1 as is shown in FIG. 7. The center of the resistor element 4 corresponds to the center of the metal substrate 1.

EXAMPLE 8

Yet another pressure sensor was produced in the same manner as in Example 5 except that a circular resistor element 4 and arc-shaped electrodes 3 were formed at the center of the metal substrate 1 as is shown in FIG. 8. The center of the resistor element 4 corresponds to the center of the metal substrate 1.

Comparative Example 3

A pressure sensor was produced in the same manner as in Example 5 except that a resistor element 4 and electrodes 3 both having the same shape as in Example 5 were formed at 10 mm away from the center of the metal substrate 1 as is shown in FIG. 9. The center of the resistor element 4 does not correspond to the center of the metal substrate 1.

Comparative Example 4

A pressure sensor was produced in the same manner as in Example 5 except that a resistor element 4 and electrodes 3 were formed at 10 mm away from the center of the metal substrate 1 as is shown in FIG. 10. The center of the resistor element 4 corresponds to the center of the meal substrate 1.

Comparative Example 5

The metal substrate 1 was coated with a partially devitrified enamel in the same manner as in Example 5, and then a commercially available strain gauge was adhered on the meal substrate 1. The center of the strain gauge corresponds to the center of the metal substrate 1.

EXAMPLE 9

In the pressure sensor according to Example 5, the resistor element 4 has a top surface which is symmetrical with respect to the center thereof, and the center of the metal substrate 1 and the center of the resistor element 4 substantially correspond to each other.

In the pressure sensor according to Example 6, the resistor element 4 and the electrodes 3 each have a profile of a regular octagon which is symmetrical with respect to the center thereof. Further, since the center of the metal substrate 1 and the center of the resistor element 4 substantially correspond to each other, the pressure sensor has no directional dependency. In other words, the sensitivity of the pressure sensor is not changed in accordance with the direction in which a force is applied.

In the pressure sensor according to Example 7, the resistor element 4 and the electrodes 3 each have a circular shape which is symmetrical with respect to the center thereof. Further, since the center of the metal substrate 1 and the center of the resistor element 4 substantially correspond to each other, the pressure sensor has no directional dependency.

In the pressure sensor according to Example 8, the resistor element 4 is circular and the electrodes 3 are arc-shaped. Further, since the center of the metal substrate 1 and the center of the resistor element 4 substantially correspond to each other, the pressure sensor has no directional dependency.

In the pressure sensor according to Comparative Example 3, although the resistor element 4 is symmetrical with respect to the center thereof, the center of the metal substrate 1 and the center of the resistor element 4 do not correspond to each other.

In the pressure sensor according to Comparative Example 4, although the center of the metal substrate 1 and the center of the resistor element 4 correspond to each other, neither the resistor element 4 nor the electrodes 3 are symmetrical with respect to the center thereof. Accordingly, the pressure sensor has directional dependency.

Figure 13:
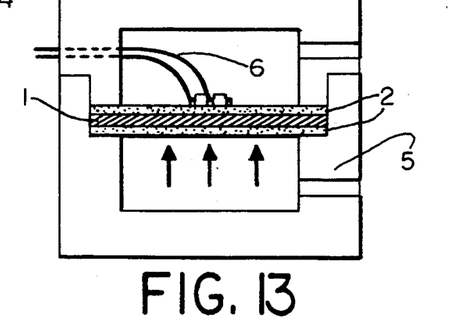
FIG. 13 is a view illustrating a method for measuring a change in the resistance of a pressure sensor by applying a load thereto.

The pressure sensors according to Examples 5 through 8 and Comparative Examples 3 through 5 were mounted on a jig 5 as is shown in FIG. 13. Pressures of 0, 400, 800, 1,200, 1,600, and 2,000 mmH$_2$O were applied on a surface of each pressure sensor opposite to the surface on which the resistor element was formed. The results are shown in Table 7.

TABLE 7

| Pressure versus change ratio in the resistance (%) | | | | | | |
| --- | --- | --- | --- | --- | --- | --- |
| Pressure (mm Hg) | 0 | 400 | 800 | 1200 | 1600 | 2000 |
| Example 5 | 0 | 0.119 | 0.241 | 0.360 | 0.477 | 0.587 |
| Example 6 | 0 | 0.126 | 0.250 | 0.376 | 0.501 | 0.626 |
| Example 7 | 0 | 0.148 | 0.294 | 0.441 | 0.590 | 0.737 |
| Example 8 | 0 | 0.139 | 0.279 | 0.418 | 0.556 | 0.696 |
| Comparative Example 3 | 0 | 0.059 | 0.118 | 0.180 | 0.239 | 0.301 |
| Comparative Example 4 | 0 | 0.072 | 0.142 | 0.214 | 0.288 | 0.355 |
| Comparative Example 5 | 0 | 0.014 | 0.029 | 0.042 | 0.056 | 0.071 |

In the pressure sensors according to Examples 5 through 8, the top surface of the resistor element 4 is symmetrical with respect to the center thereof. Since the center of the metal substrate 1 corresponds to the center of the resistor element 4, a strain caused by a compressive stress or a tensile stress generated when a pressure is applied to the pressure sensor is uniformly distributed from the center of the resistor element 4 to all the directions. Further, the center of the resistor element 4 has a maximum degree of strain, and thus has the highest change ratio in the resistance of the resistor element 4. In the pressure sensors according to Comparative Examples 3 through 5, the strain is not uniformly distributed from the center of the resistor element 4 in all directions, and the center of the resistor element 4 does not have a maximum degree of strain. Accordingly, the sensitivity is low.

The pressure sensors according to Examples 6 through 8 are superior to the pressure sensor according to Example 5 in the following points.

In the case when the pressure sensor according to Example 5 is adhered on such a member that receives a stress only in one particular direction, for example, a suspension of a vehicle, the sensitivity is changed in accordance with the direction in which the pressure sensor is adhered. Namely, the pressure sensor has the directional dependency. In the case of the pressure sensors according to Examples 6 through 8, in contrast, the sensitivity is not changed. Namely, the pressure sensors have no directional dependency.

The difference between the pressure sensors according to Examples 5 and those according to Examples 6 through 8 will be described in more detail.

Supposing that forces (i.e., pressure, stress or load) are applied in different directions a, b and c to the pressure sensor according to Example 5 as is shown in FIG. 5A, the force in the direction of a enlarges a cross sectional area of the resistor element 4 and also reduces the length thereof. Accordingly, the resistance of the resistor element 4 is decreased. The forces from the directions b and c reduce the cross sectional area of the resistor element 4 and thus increase the resistance thereof. In other words, the forces in the directions b and c lower the sensitivity of the resistor element 4.

In the case of the pressure sensors according to Examples 6 through 8, the force in any direction a, b or c enlarges the cross sectional area of the resistor element 4 and reduces the length thereof, thereby improving the sensitivity thereof.

As is apparent from Table 7, the pressure sensors according to Examples 5 through 8 of the present invention have a higher sensitivity to a pressure than the pressure sensors according to Comparative Examples 3 through 5. Especially, the pressure sensors according to Examples 6 through 8 with no directional dependency have excellent sensitivity.

EXAMPLE 10

Figure 11:
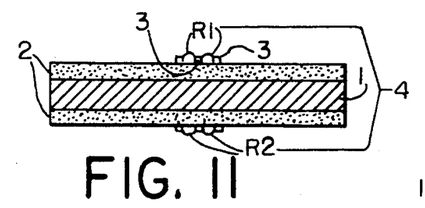
FIG. 11 is a cross sectional view of a pressure sensor according to yet another example of the present invention.

As is shown in FIG. 11, both surfaces of the metal substrate 1 were coated with glass layers 2, and resistor elements R1 and R2 and electrodes 3 each having an identical shape and an identical resistance with those in Example 7 were formed on the glass layers 2 respectively in the same manner as in Example 5, thereby producing still another pressure sensor. Centers of the resistor elements R1 and R2 correspond to the center of the metal substrate 1.

EXAMPLE 11

As is shown in FIG. 12, circular resistor elements R3 (inner) and R4 (outer) and circular electrodes 3 were formed on the glass layer 2 in the same manner as in Example 5, thereby producing still another pressure sensor. The inner resistor elements R3 was formed so as to have the center thereof within 15 mm from the center of the metal substrate 1, and the outer resistor element R4 was formed within 15 mm from the center of the metal substrate 1. Further, the resistor element R3 and R4 were formed so that the centers thereof correspond to the center of the metal substrate 1.

EXAMPLE 12

The pressure sensors according to Examples 10 and 11 were evaluated for a change ratio in the resistance of the resistor elements R1, R2, R3, and R4. The resistor elements R1, R3 and R4 were applied with a tensile stress. The results are shown in Table 8.

TABLE 8

| Pressure versus change ratio in the resistance (%) | | | | | | |
|---|---|---|---|---|---|---|
| Pressure (mm Hg) | | 0 | 400 | 800 | 1200 | 1600 | 2000 |
| Example 10 | R1 | 0 | 0.148 | 0.294 | 0.441 | 0.590 | 0.737 |
| | R2 | 0 | −0.148 | −0.292 | −0.440 | −0.588 | −0.735 |
| Example 11 | R3 | 0 | 0.149 | 0.294 | 0.442 | 0.590 | 0.737 |
| | R4 | 0 | −0.032 | −0.063 | −0.096 | −0.126 | −0.158 |

The resistor elements R1 and R2 of the pressure sensor according to Example 10 are considered to be one resistor element. In other words, the absolute values of the change ratio in the resistance of the resistor elements R1 and R2 are added. The sum thus obtained is 0.296% at a pressure of 400 mmH$_2$O, 0.586% at 800 mmH$_2$O, 0.881% at 1,200 mmH$_2$O, 1.178% at 1,600 mmH$_2$O, and 1.472% at 2,000 mmH$_2$O, which are extremely high.

The resistor elements R3 and R4 of the pressure sensor according to Example 11 are considered to be one resistor element. In this case, the sensitivity to a pressure is higher than that of a pressure sensor having only one resistor element.

Figure 14:
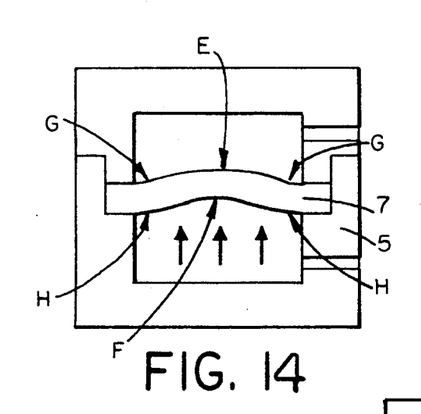
FIG. 14 is a view illustrating a strain of a pressure sensor when a load is applied thereto.

The change ratios concerning the resistor elements R1 and R2, and R3 and R4 have different signs for the following reason. As is shown in FIG. 14, an outermost periphery of the metal substrate 1 is completely held by the jig 5. Accordingly, when a compressive stress is applied to the center F of a surface receiving a pressure, a tensile stress is applied to the center E of a surface opposite thereto. Then, a compressive stress is applied to an outer peripheral portion G of the metal substrate 1 in the vicinity of the jig, and thus a tensile stress is applied to the outer peripheral portion H of the metal substrate 1.

The arrangement of the resistor elements and the electrodes as in Examples 10 and 11 significantly improves the sensitivity to a pressure. A pressure sensor having a still higher sensitivity can be produced by forming the resistor elements on both surface of the metal substrate 1. The pressure sensor according to Example 10 can measure the sum of the pressures at two points or can detect a difference between the pressures at two points.

EXAMPLE 13

A pressure sensor according to the present invention can be used in a pressure detecting apparatus for detecting a combustion pressure or a manifold air pressure of a vehicle engine.

Figure 15:
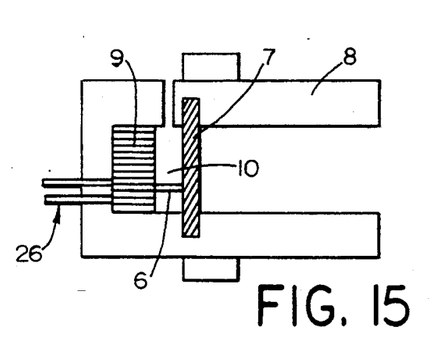
FIG. 15 is a cross sectional view of a pressure detecting apparatus for use in a vehicle to which a pressure sensor according to the present invention is applied.

FIG. 15 is a cross sectional view of such a pressure detecting apparatus 10 utilizing a pressure sensor according to Example 5 or 10. The pressure detecting apparatus 10 includes a pressure sensor 7 welded to an outer frame 8, and a pressure detecting circuit 9 connected to the pressure sensor 7 through a lead wire 6.

Figure 16:
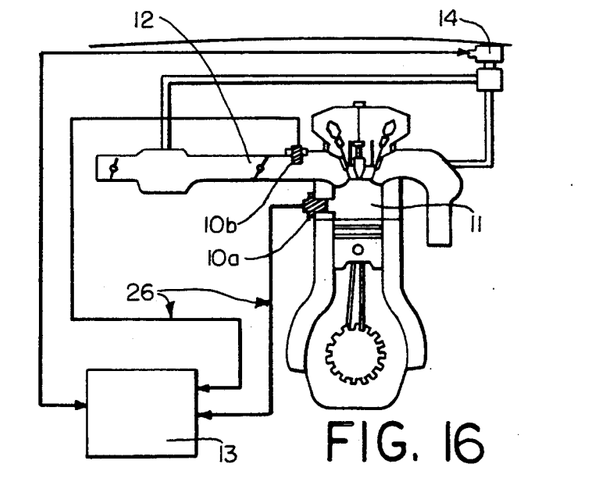
FIG. 16 is a view illustrating a plurality of the pressure detecting apparatuses shown in FIG. 15 provided in a vehicle.

The pressure detecting circuit 9 includes a power source, an amplifier, etc. A pressure detected by the pressure detecting circuit 9 is output to an engine controlling computer 13 (FIG. 16) through a signal line 26. As is shown in FIG. 16, the pressure detecting apparatus 10 is attached to a side wall of an engine combustion chamber 11 so as to be used as a combustion pressure detecting apparatus 10a for detecting combustion pressure (absolute pressure). An identical pressure detecting apparatus 10 is attached in a manifold 12, as is also shown in FIG. 16 to be used as an intake pressure detecting apparatus 10b for detecting the difference between the pressure in the manifold and an atmospheric pressure. For the pressure detecting apparatus 10a, a pressure sensor according to Example 5 is used, and for the pressure detecting apparatus 10b, a pressure sensor according to Example 10 is used.

The combustion pressure and the amount of the air inhalated are detected by the pressure detecting apparatuses 10a and 10b respectively, and the signals are sent from the engine controlling computer 13 to an electronically controlled EGR valve 14, thereby precisely controlling the mixing ratio of the air and the fuel. By this system, $NO_x$ can be reduced by 10% or more compared with the case where neither the combustion pressure detecting apparatus 10a nor the intake pressure detecting apparatus 10b is provided.

Conventionally, a semiconductor-type pressure sensor has been used for monitoring pressure in an environment such as the above since such a semiconductor-type pressure sensor is inferior in heat resistance, the pressure cannot be measured with high accuracy in the above environment in which ambient temperature is raised up to 400° C. by combustion of the fuel. In contrast, a pressure sensor according to the present invention is excellent in heat resistance as is described in Example 13, and thus can directly detect a combustion pressure. Further, a pressure sensor according to the present invention has a high response speed as is proven by the fact that the pressure can be measured with high accuracy at an engine combustion cycle of several thousand rpm.

EXAMPLE 14

A pressure sensor according to the present invention can also be used in a static pressure detecting apparatus which is provided in a main duct of large- or medium-scale buildings in order to control the amount of air provided by an air conditioning system.

Figure 17:
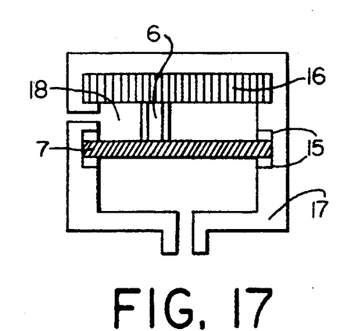
FIG. 17 is a cross sectional view of a static pressure detecting apparatus to which a pressure sensor according to the present invention is applied.

FIG. 17 is a cross sectional view of such a static pressure detecting apparatus 18 utilizing a pressure sensor according to Example 5.

The static pressure detecting apparatus 18 includes a pressure sensor 7, O-rings 15, a lead wire 6, a circuit 16 having a power source, an amplifier, etc., and an outer frame 17.

Figures 18, 19A, 19B, 19C, 20A, 20B, 20C:
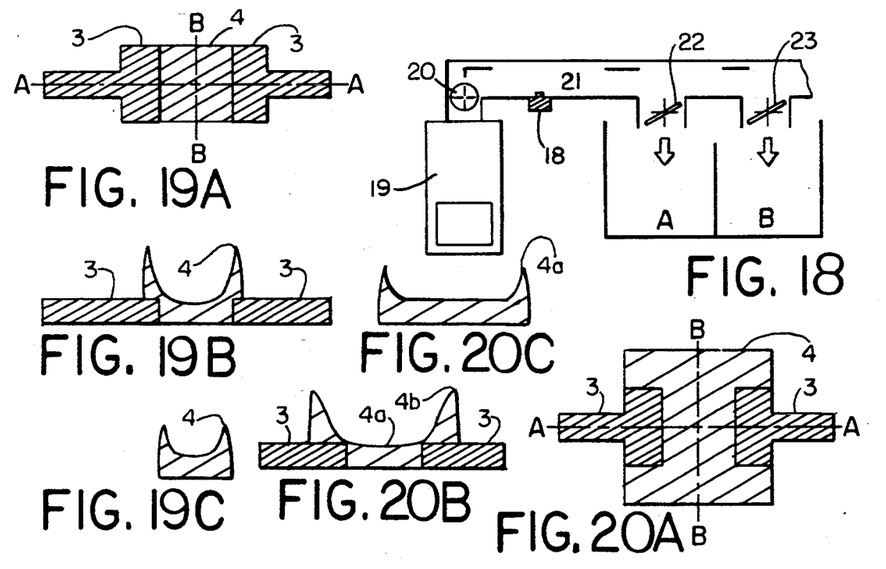
FIG. 18 is a view illustrating the static pressure detecting apparatus shown in FIG. 17 provided in an air conditioning system.
FIG. 19A is a plan view of a pressure sensor according to yet another example of the present invention.
FIG. 19B is a cross sectional view of the pressure sensor along line A—A of FIG. 19A.
FIG. 19C is a cross sectional view of the pressure sensor along line B—B of FIG. 19A.
FIG. 20A is a plan view of a pressure sensor according to yet another example of the present invention.
FIG. 20B is a cross sectional view of the pressure sensor along line A—A of FIG. 20A.
FIG. 20C is a cross sectional view of the pressure sensor along line B—B of FIG. 20A.

As is shown in FIG. 18, the static pressure detecting apparatus 18 is attached on a main duct 21 of an air conditioning system for controlling temperatures of areas A and B by one air conditioner 19. A change in the amount of the air in the main duct 21 is detected by the static pressure detecting apparatus 18. By controlling the rotation speed of a fan 20 and open/close switching of dampers 22 and 23 based on amount of the air detected by the static pressure detecting apparatus 18, the controlling precision of the temperatures is enhanced, and further electric energy is saved by 12% or more.

EXAMPLE 15

Still another pressure sensor was produced in the same manner as in Example 5 except that electrodes 3 including Au were used. A plate-shaped metal substrate having an outer diameter of 40 mm and a thickness of 60 μm was pre-treated by degreasing, rinsing, acid washing, rinsing, nickel plating, and then rinsing. The resultant metal substrate was immersed in a slurry containing the partially devitrified enamel having the composition of Sample 7 in Table 1, end a DC voltage was applied between a counter electrode and the metal substrate to coat the metal substrate with the partially devitrified enamel. The temperature was raised from room temperature to 880° C. in 4 hours, and the resultant metal substrate coated with the glass particles was sintered at this temperature for 10 minutes, thereby forming a glass layer of the partially devitrified enamel. A paste including an organic metal compound containing Au was printed in a pattern shown in FIG. 19A on a surface of the glass layer by screen printing, and then sintered at a temperature of 850° C., thereby forming a pair of electrodes 3 each having a thickness of 0.5 μm. A paste mainly including ruthenium oxide and glass frit was printed between the electrodes 3, and then sintered at a temperature of 830° C., thereby forming e resistor element 4 having a size of 1.00 mm × 1.00 mm. In this manner, five pressure sensors having a shape shown in FIG. 19A were produced. The resistor element 4 has an average thickness of 10 μm except for a projection 4b at a periphery thereof (FIGS. 19B and 19C).

EXAMPLE 16

Electrodes 3 each having a thickness of 10 μm were produced in the same manner as in Example 15, namely, by printing a paste including an organic metal compound containing Au on the glass layer by screen printing and then sintering the glass layer with the paste at a temperature of 850° C. A paste mainly including ruthenium oxide and glass frit was printed between the electrodes 3, and then sintered at a temperature of 830° C., thereby forming a resistor element 4 having a size of 1.00 mm × 1.00 mm. In this manner, five pressure sensors having a shape shown in FIG. 19A were produced. The resistor element 4 has an average thickness of 10 μm except for a projection at a periphery thereof (FIGS. 19B and 19C).

Comparative Example 6

Electrodes 3 each having a thickness of 10 μm were produced in the same manner as in Example 15 except that a Ag—Pd glass paste was used instead of the paste including an organic metal compound containing Au. A resistor element 4 having a size of 1.00 mm × 1.00 mm was produced in the same manner as in Example 15. In this manner, five pressure sensors having a shape shown in FIG. 19A were produced. The resistor element 4 has an average thickness of 10 μm except for a projected portion at a periphery thereof (FIGS. 19B and 19C).

EXAMPLE 17

The pressure sensors according to Examples 15 and 16, and Comparative Example 6 were evaluated for the TCR (temperature dependent change in resistance; the low temperature region: −30° to 25° C.; the high temperature region: 25° to 125° C.), and the change ratio in the resistance when applied with a pressure of 2,000 $mmH_2O$ (hereinafter, referred to simply as "resistance"). The sample-to-sample deviation (within lot deviation) in these values was also evaluated. The results are shown in Table 9.

TABLE 9

|  |  | TCR (ppm/°C.) | | Change ratio in resistance (%) at 2000 mm H$_2$O |
|---|---|---|---|---|
|  |  | Low temp. region | High temp. region |  |
| Example | 15-1 | 11.1 | 9.8 | 0.59 |
|  | 15-2 | 12.0 | 10.5 | 0.60 |
|  | 15-3 | 10.9 | 9.3 | 0.59 |
|  | 15-4 | 11.5 | 9.9 | 0.61 |
|  | 15-5 | 11.7 | 9.8 | 0.60 |
| Example | 16-1 | 20.3 | 13.1 | 0.60 |
|  | 16-2 | 23.5 | 15.6 | 0.58 |
|  | 16-3 | 21.9 | 13.9 | 0.61 |
|  | 16-4 | 19.8 | 13.0 | 0.59 |
|  | 16-5 | 22.1 | 14.7 | 0.62 |
| Comparative | 6-1 | 70.1 | 35.3 | 0.63 |
| Example | 6-2 | 85.3 | 41.2 | 0.62 |
|  | 6-3 | 93.3 | 48.8 | 0.60 |
|  | 6-4 | 76.6 | 36.7 | 0.58 |
|  | 6-5 | 81.7 | 38.9 | 0.57 |

As is apparent from Table 9, the pressure sensors according to Examples 15 and 16 having the electrodes 3 containing Au show small values in the change ratio in the resistance, in the TCR, and in the deviation of the TCR. Further, the pressure sensors having the electrodes 3 formed of a paste including an organic metal mainly containing Au has a significantly lower TCR and a significantly smaller deviation thereof than those of the pressure sensors produced according to Comparative Example 6 having the electrodes containing a Ag—Pd glass paste.

The change ratio in the resistance and the TCR of the pressure sensors according to Comparative Example 6 are high for the following reasons.

(1) Since bubbles, block the flow of the electric current, the resistance of the resistor element 4 changes in accordance with the number of the bubbles therein. According to Comparative Example 6, a pair of electrodes 3 formed of a Ag—Pd glass paste and each having a thickness of 10 μm are formed and a glass paste including ruthenium oxide and glass frit is printed between the electrodes 3 so as to form a resistor element 4 having a thickness of 10 μm and a shape shown in FIG. 19A. In this case, the resistor element 4 has a cross section projected at both ends thereof as is shown in FIGS. 19B and 19C (meniscus shape). The projection has a thickness which is at least twice as large as the thickness of a flat region of a central portion. The projection includes more bubbles therein than the central portion, and the bubbles block the electric current flow. In the case when a plurality of resistor elements 4 are formed by printing, each resistor element 4 has a different thickness of the projection, and so the plurality of the resistor elements 4 cannot be completely identical with each other. Consequently, each pressure sensor has a different resistance, and has a different TCR.

(2) Glass of the Ag—Pd glass paste for the electrodes 3 and glass of the glass paste mainly including ruthenium oxide and glass frit for the resistor element 4 are mixed with each other during sintering. Accordingly, Ag—Pd in the electrodes 3 and ruthenium oxide in the resistor element 4 each have a different size from the printed size. As a result, the resistance and the TCR are different for each resistor element 4.

(3) In the case when an electrode 3 formed of a Ag—Pd glass paste is used, Ag is reacted with the material of the resistor element 4 or diffused and mixed therewith, the composition for the electrode 3 is changed in the vicinity of interfaces between the electrodes 3 and the resistor element 4. This also results in the resistance and the TCR which are different for each resistor element 4.

The resistance and the TCR of the pressure sensors according to Examples 15 and 16 are substantially constant for the following reasons.

(1) Since a paste including an organic metal compound containing Au can be formed into a thin film, the electrode 3 can have a thickness of 0.5 μm or less by sintering the paste. Even by use of a usual method for forming a film as thick as 5 to 10 μm (thick film technology), the resultant film has a substantially identical thickness with a film formed by a method for forming a film as thin as 1 μm (thin film technology). Since the film can be formed to be thin, the resultant electrode 3 does not have such a projection as is shown in FIGS. 19B and 19C. Accordingly, the number of the bubbles inside the electrode 3 is much smaller than the case of Comparative Example 6, resulting in a constant resistance and a constant TCR. In Example 15, the thickness of the electrode 3 is 0.5 μm, and that of the resistor element 4 is 10 μm. The thickness of the electrode 3 is 1/20 of that of the resistor element 4. In the case when the thickness of the electrode 3 is half or less of that of the resistor element 4, the projection of the resistor element 4 is lower than the one shown in FIG. 19B. Further, in the case when the thickness of the electrode 3 is ⅓ or less of that of the resistor element 4, the resistor element 4 is not projected.

(2) Since the paste including an organic metal compound containing Au used in Examples 15 and 16 has an extremely low amount of glass than a Ag—Pd glass, the paste for the electrode 3 and the glass in the paste for the resistor element 4 are not mixed with each other. Accordingly, the electrodes 3 and resistor element 4 are both formed into a size identical with the printed size, resulting in a constant resistance and a constant TCR.

(3) Au is extremely stable, and does not react with other materials as in the case of silver, or is not diffused into the resistor element 4. This also results in a constant resistance and a constant TCR.

The pressure sensors having electrodes 3 including Au according to Examples 15 and 16 each have a smaller TCR (change ratio in the resistance due to the temperature change) than the pressure sensors having electrodes 3 including Ag—Pd according to Comparative Example 6. Therefore, the pressure sensors according to Examples 15 and 16 can be used in a severe environment where the temperature dynamically changes.

EXAMPLE 18

A glass layer was formed on a metal substrate in the same manner as in Example 5. Next, a Ag—Pd glass paste was printed on a surface of the glass layer by screen printing in a shape shown in FIG. 20A, and sintered at a temperature of 850° C. In this manner, a pair of electrodes 3 were formed. Each electrode 3 has a width (in the direction of line B—B) of 1.0 min. A space between the electrodes 3 is 1.0 mm long. A resistor element 4 having a size of 2.0 mm×2.0 mm was formed as is shown in FIG. 20A, and parts of the projection 4b shown in FIG. 20B were removed to produced a resistor element 4. In this manner, three pressure sensors were produced. The resistor element 4 has an average thickness of 10 μm except for a projection 4b shown in FIG. 20C.

EXAMPLE 19

Three pressure sensors having the shape shown in FIG. 20A were produced in the same manner as in Example 18. The resistor element 4 has a size of 1.5 mm×1.5 mm, and an average thickness of 10 μm except for the projection shown in FIG. 20C.

EXAMPLE 7

Three pressure sensors having the shape shown in FIG. 20A were produced in the same manner as in Example 18. The resistor element 4 has a size of 1.3 mm×1.3 mm, and an average thickness of 10 μm except for the projection shown in FIG. 20C.

EXAMPLE 20

Three pressure sensors having the shape shown in FIG. 20A were produced in the same manner as in Example 18. The resistor element 4 has a size of 2.0 mm×2.0 mm, and an average thickness of 5 μm except for the projection shown in FIG. 20C.

EXAMPLE 21

Three pressure sensors having the shape shown in FIG. 20A were produced in the same manner as in Example 18 except that electrodes 3 formed of a paste including an organic metal compound containing Au according to Example 15 were used. The resistor element 4 has a size of 2.0 mm×2.0 mm, and an average thickness of 5 μm except for the projection shown in FIG. 20C.

Comparative Example 8

Three pressure sensors having the shape shown in FIG. 20A were produced in the same manner as in Example 18. The resistor element 4 has a size of 2.0 mm×2.0 mm, and an average thickness of 15 μm. except for the projection shown in FIG. 20C.

Comparative Example 9

Three pressure sensors having the shape shown in FIG. 20A were produced in the same manner as in Example 18. The resistor element 4 has a size of 2.0 mm×2.0 ram, and an average thickness of 30 μm except for the projection shown in FIG. 20C.

EXAMPLE 22

The pressure sensors according to Examples 18 through 21, and Comparative Examples 7 through 9 were evaluated for the TCR (the low temperature region: −30° to 25° C.; the high temperature region: 25° to 125° C.) and the change ratio in the resistance when applied with a pressure of 2,000 mmH$_2$O (hereinafter, referred to simply as "resistance"). The sample-to-sample deviation in these values was also evaluated. The results are shown in Table 10.

TABLE 10

|  |  | Electrode | Size of resistor 4 (mm) | Thickness of resister 4 (μm) | TCR (ppm/°C.) Low temp. region | TCR (ppm/°C.) High temp. region |
| --- | --- | --- | --- | --- | --- | --- |
| Example | 18-1 | Ag—Pd | 2.0 × 2.0 | 10 | 20.3 | 13.3 |
|  | 18-2 |  |  |  | 18.9 | 12.9 |
|  | 18-3 |  |  |  | 17.5 | 12.1 |
| Example | 19-1 | Ag—Pd | 1.5 × 1.5 | 10 | 33.7 | 19.1 |
|  | 19-2 |  |  |  | 27.5 | 17.6 |
|  | 19-3 |  |  |  | 25.9 | 15.2 |
| Comparative Example | 7-1 | Ag—Pd | 1.3 × 1.3 | 10 | 75.9 | 33.4 |
|  | 7-2 |  |  |  | 63.1 | 30.7 |
|  | 7-3 |  |  |  | 58.7 | 29.9 |
| Example | 20-1 | Ag—Pd | 2.0 × 2.0 | 5 | 22.1 | 18.6 |
|  | 20-2 |  |  |  | 26.3 | 21.6 |
|  | 20-3 |  |  |  | 19.4 | 16.2 |
| Example | 21-1 | Au | 2.0 × 2.0 | 5 | 3.2 | 1.1 |
|  | 21-2 |  |  |  | 3.3 | 1.2 |
|  | 21-3 |  |  |  | 2.9 | 1.0 |
| Comparative Example | 8-1 | Ag—Pd | 2.0 × 2.0 | 15 | 132.6 | 108.4 |
|  | 8-2 |  |  |  | 124.9 | 101.9 |
|  | 8-3 |  |  |  | 119.6 | 99.2 |
| Comparative Example | 9-1 | Ag—Pd | 2.0 × 2.0 | 30 | 311.6 | 234.1 |
|  | 9-2 |  |  |  | 278.6 | 191.3 |
|  | 9-3 |  |  |  | 259.9 | 170.6 |

As is apparent from the measurement results of the pressure sensors according to Examples 18 and 19, and the Comparative Example 7 shown in Table 10, in the case when the resistor element 4 has a size larger than a portion of 1.0 mm×1.0 mm sandwiched by a pair of electrodes 3 and parts of the projection 4b are removed, the TCR is small.

This fact is considered to be related bubbles in the projection 4b as is described below.

In the case of the pressure sensors according to Example 15 shown in FIG. 19A, the projection of the resistor element 4 has a length (in a direction of line A—A) of approximately 0.2 mm while a length of the space between the electrodes 3, namely, the intended length of the resistor element 4 is 1.0 mm. Since undesirable bubbles contained in the projection are diffused to the flat central portion, the TCR is not reduced even if the parts of the projection are removed.

In the case of the pressure sensors according to Examples 18 and 19, the resistor element 4 is formed so as to have a length which is 1.4 times or more of the length of the space between the electrodes 3 so that the projection 4b will not be formed on the flat central portion 4a. Accordingly, undesirable bubbles are not contained in the flat central portion 4a, thereby reducing the TCR. In contrast, according to Comparative Example 7, the length of the resistor element 4 is less than 1.4 times of the length of the space between the electrodes 3. Accordingly, undesirable bubbles are contained in the flat central portion 4a, thereby keeping the TCR high.

As is apparent from the measurement results of the pressure sensors according to Examples 18 and 20, and Comparative Examples 8 and 9 shown in Table 10, the average thickness of the resistor element 4 except for the projection 4b is preferably 10 μm or less. When the average thickness is more than 10 μm, the TCR increases by the average thickness. The reason for this increase may be attributed to the amount of the bubbles which is increased with the average thickness.

As has been described, a pressure sensor according to the present invention is highly sensitive to pressure, and thus can be used, for example, as a sensor for detecting the vapor pressure of a liquid. As is described in the Examples, a pressure sensor having an extremely high sensitivity is obtained by providing a resistor element having an appropriate shape at an appropriate position.

Since a pressure sensor according to the present invention includes a glass layer formed of a partially devitrified enamel material, the components of the metal substrate and the components of the glass layer are diffused and mixed with each other at an interface therebetween, thereby significantly improving the adhesion of the metal substrate and the glass layer. Further, the glass layer is porous and includes a great number of microscopic foams. The foams act as a buffer against mechanical impact. Accordingly, a pressure sensor according to the present invention can withstand even a strong mechanical impact.

Further, by using an electrode including Au, a pressure sensor is provided that has little deviation in the resistance and the TCR and can thus be used in a severe environment where the temperature dynamically changes is provided. Moreover, by using a resistor element 4 having a thickness of 10 μm or less, a pressure sensor having an extremely small TCR and an extremely small deviation in the TCR is provided.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A pressure sensor, comprising:
   a plate-shaped metal substrate;
   a glass layer provided on a surface of the metal substrate and mainly containing a partially devitrified enamel composition;
   a resistor element which is provided on a surface of the glass layer and has an electric resistance changed in accordance with the degree of strain thereof;
   a pair of electrodes connected to the resistor element; and
   wherein the resistor element is provided so as to receive a stress, a pressure, or a load applied perpendicularly to a surface thereof, the center of a top surface of the resistor element substantially corresponds to the center of a strain of the surface of the metal substrate that is generated when a pressure is applied to the pressure sensor, and the resistor element and the electrode are each symmetrical with respect to the center thereof.

2. A pressure sensor according to claim 1, wherein the resistor element and the electrode each have such a shape that provides the resistor element with no directional dependency with respect to pressure or stress.

3. A pressure sensor according to claim 2, wherein the surface of the resistor element and a top surface of the electrode each have a shape selected from the group consisting of a circular shape, a ring shape, an arc shape, and a polygonal shape.

4. A pressure sensor according to claim 2, wherein the surface of the glass layer is provided with a plurality of the resistor elements and a plurality of the electrodes formed thereon.

5. A pressure sensor according to claim 2, further comprising another glass layer on another surface of the metal substrate and wherein the surfaces of both of the glass layers are each provided with at least one resistor element and at least a pair of electrodes formed thereon.

6. A pressure detecting apparatus comprising a pressure sensor according to claim 2 which is provided in an engine manifold of a vehicle, wherein an amount of air inhalated into the manifold is controlled by obtaining a difference between a pressure in the manifold and an atmospheric pressure.

7. A pressure sensor according to claim 1, wherein the partially devitrified enamel composition comprises $SiO_2$ in the range of 7–33 wt. %, $B_2O_3$ in the range of 5 to 31 wt. %, MgO in the range of 20 to 50 wt. %, CaO in the range of 0 to 20 wt. %, BaO in the range of 0 to 50 wt. %, $La_2O_3$ in the range of 0 to 40 wt. %, $P_2O_5$ in the range of 0 to 5 wt. %, and $MO_2$ in the range of 0 to 5 wt. %, where M is one element selected from the group consisting of Zr, Ti and Sn.

8. A pressure sensor according to claim 1, wherein the electrodes contain gold.

9. A pressure sensor according to claim 8, wherein the partially devitrified enamel composition comprises $SiO_2$ in the range of 7–33 wt. %, $B_2O_3$ in the range of 5 to 31 wt. %, MgO in the range of 20 to 50 wt. %, CaO in the range of 0 to 20 wt. %, BaO in the range of 0 to 50 wt. %, $La_2O_3$ in the range of 0 to 40 wt. %, $P_2O_5$ in the range of 0 to 5 wt. %, and $MO_2$ in the range of 0 to 5 wt. %, where M is one element selected from the group consisting of Zr, Ti and Sn.

10. A pressure sensor according to claim 1, wherein the resistor element has an average thickness of 10 μm or less except for a projection at a periphery thereof.

11. A pressure sensor according to claim 10, wherein the partially devitrified enamel composition comprises $SiO_2$ in the range of 7–33 wt. %, $B_2O_3$ in the range of 5 to 31 wt. %, MgO in the range of 20 to 50 wt. %, CaO in the range of 0 to 20 wt. %, BaO in the range of 0 to 50 wt. %, $La_2O_3$ in the range if 0 to 40 wt. %, $P_2O_5$ in the range of 0 to 5 wt. %, and $MO_2$ in the range of 0 to 5 wt. %, where M is one element selected from the group consisting of Zr, Ti, and Sn.

12. A pressure detecting apparatus comprising a pressure sensor according to claim 1, which is provided on a wall of a combustion chamber of a vehicle engine, wherein a pressure in the combustion chamber is directly detected.

13. A pressure detecting apparatus comprising a pressure sensor according to claim 1, which is provided in a main duct of an air conditioning system, wherein a change in an amount of air in the main duct is detected as a pressure.

14. A pressure detecting system for use in a vehicle, comprising:
   a first pressure detecting apparatus which is provided on a wall of the combustion chamber of the engine for said vehicle, wherein a pressure in the combustion chamber is directly detected; and
   a second pressure detecting apparatus which is provided in the manifold of said engine, wherein an amount of air inhalated into the manifold is controlled by obtaining a difference between a pressure in the manifold and atmospheric pressure;

said first pressure detecting apparatus and said second pressure detecting apparatus each comprising the pressure sensor of claim 1;

the resistor element and the electrode in the pressure sensor in said second pressure detecting apparatus each have such a shape that provides said resistor element with no directional dependency with respect to pressure or stress.

15. A pressure detecting system for use in a vehicle, comprising:

a first pressure detecting apparatus which is provided on a wall of the combustion chamber of the engine for said vehicle, wherein a pressure in the combustion chamber is directly detected; and a second pressure detecting apparatus which is provided in the manifold of said engine, wherein an amount of air inhalated into the manifold is controlled by obtaining a difference between a pressure in the manifold and atmospheric pressure;

said first pressure detecting apparatus and said second pressure detecting apparatus each comprising the pressure sensor of claim 1;

wherein in the pressure sensor in said second pressure detecting apparatus the center of a top surface of the resistor element substantially corresponds to the center of the surface of the metal substrate, the resistor element and the electrode are each symmetrical with respect to the center thereof, and the resistor element and the electrode each have such a shape that provides said resistor element with no directional dependency with respect to pressure or stress.

16. A pressure detecting system for use in a vehicle, comprising:

a first pressure detecting apparatus which is provided on a wall of the combustion chamber of the engine for said vehicle, wherein a pressure in the combustion chamber is directly detected; and a second pressure detecting apparatus which is provided in the manifold of said engine, wherein an amount of air inhalated into the manifold is controlled by obtaining a difference between a pressure in the manifold and atmospheric pressure;

said first pressure detecting apparatus and said second pressure detecting apparatus each comprising the pressure sensor of claim 1;

wherein in the pressure sensor in said second pressure detecting apparatus the resistor and the electrode each have such a shape that provides said resistor element with no directional dependency with respect to pressure or stress; and wherein in the pressure sensor in said first pressure detecting apparatus the center of a top surface of the resistor element substantially corresponds to the center of the surface of the metal substrate, and the resistor element and the electrode are each symmetrical with respect to the center thereof.

17. A pressure detecting system for use in a vehicle, comprising:

a first pressure detecting apparatus which is provided on a wall of the combustion chamber of the engine for said vehicle, wherein a pressure in the combustion chamber is directly detected; and a second pressure detecting apparatus which is provided in the manifold of said engine, wherein an amount of air inhalated into the manifold is controlled by obtaining a difference between a pressure in the manifold and atmospheric pressure;

said first pressure detecting apparatus and said second pressure detecting apparatus each comprising the pressure sensor of claim 1;

wherein in the pressure sensor in said second pressure detecting apparatus the center of a top surface of the resistor element substantially corresponds to the center of the surface of the metal substrate, the resistor element and the electrode are each symmetrical with respect to the center thereof, and the resistor element and the electrode each have such a shape that provides said resistor element with no directional dependency with respect to pressure or stress; and wherein in the pressure sensor in said first pressure detecting apparatus the center of a top surface of the resistor element substantially corresponds to the center of the surface of the metal substrate, and the resistor element and the electrode are each symmetrical with respect to the center thereof.

18. A pressure sensor comprising:

a plate-shaped metal substrate;

glass layers provided on both surfaces of the metal substrate respectively and mainly containing a partially devitrified enamel composition;

a resistor element which is provided on a surface of one of the glass layers and has an electric resistance changed in accordance with the degree of strain thereof;

a pair of electrodes connected to the resistor element; and wherein the electrodes each have a thickness of $\frac{1}{2}$ or less of the thickness of the resistor element.

19. A pressure sensor according to claim 18, wherein the electrodes contain gold.

20. A pressure sensor according to claim 19, wherein the partially devitrified enamel composition comprises $SiO_2$ in the range of 7–33 wt. %, $B_2O_3$ in the range of 5 to 31 wt. %, MgO in the range of 20 to 50 wt. %, CaO in the range of 0 to 20 wt. %, BaO in the range of 0 to 50 wt. %, $La_2O_3$ in the range of 0 to 40 wt. %, $P_2O_5$ in the range of 0 to 5 wt. %, and $MO_2$ in the range of 0 to 5 wt. %, where M is one element selected from the group consisting of Zr, Ti and Sn.

21. A pressure sensor according to claim 18, wherein the partially devitrified enamel composition comprises $SiO_2$ in the range of 7–33 wt. %, $B_2O_3$ in the range of 5 to 31 wt. %, MgO in the range of 20 to 50 wt. %, CaO in the range of 0 to 20 wt. %, BaO in the range of 0 to 50 wt. %, $La_2O_3$ in the range of 0 to 40 wt. %, $P_2O_5$ in the range of 0 to 5 wt. %, and $MO_2$ in the range of 0 to 5 wt. %, where M is one element selected from the group consisting of Zr, Ti and Sn.

22. A pressure sensor comprising:

a plate-shaped metal substrate;

glass layers provided on both surfaces of the metal substrate respectively and mainly containing a partially devitrified enamel composition;

a resistor element which is provided on a surface of one of the glass layers and has an electric resistance changed in accordance with the degree of strain thereof;

a pair of electrodes connected to the resistor element; and wherein the resistor element has a length larger than 1.4 times of a length of a space between the electrodes and is formed by removing a projection at a periphery thereof.

23. A pressure sensor according to claim 22, wherein the resistor element has an average thickness of 10 μm or less except for the projection at a periphery thereof.

24. A pressure sensor according to claim 23, wherein the partially devitrified enamel composition comprises $SiO_2$ in the range of 7–33 wt. %, $B_2O_3$ in the range of 5 to 31 wt. %, MgO in the range of 20 to 50 wt. %, CaO in the range of 0 to 20 wt. %, BaO in the range of 0 to 50 wt. %, $La_2O_3$ in the range of 0 to 40 wt. %, $P_2O_5$ in the range of 0 to 5 wt. %, and $MO_2$ in the range of 0 to 5 wt. %, where M is one element selected from the group consisting of Zr, Ti and Sn.

25. A pressure sensor according to claim 22, wherein the partially devitrified enamel composition comprises $SiO_2$ in the range of 7–33 wt. %, $B_2O_3$ in the range of 5 to 31 wt. %, MgO in the range of 20 to 50 wt. %, CaO in the range of 0 to 20 wt. %, BaO in the range of 0 to 50 wt. %, $La_2O_3$ in the range of 0 to 40 wt. %, $P_2O_5$ in the range of 0 to 5 wt. %, and $MO_2$ in the range of 0 to 5 wt. %, where M is one element selected from the group consisting of Zr, Ti and Sn.

26. A pressure sensor comprising:
a plate-shaped metal substrate;
glass layers provided on both surfaces of the metal substrate respectively and mainly containing a partially devitrified enamel composition;
a resistor element which is provided on a surface of one of the glass layers and has an electric resistance changed in accordance with the degree of strain thereof;
a pair of electrodes connected to the resistor element; and
wherein the electrodes contain gold, and the resistor element has a length larger than 1.4 times of a length of a space between the electrodes and is formed by removing a projection at a periphery thereof.

27. A pressure sensor according to claim 26, wherein the resistor element has an average thickness of 10 μm or less except for the projection at a periphery thereof.

28. A pressure sensor according to claim 27, wherein the partially devitrified enamel composition comprises $SiO_2$ in the range of 7–33 wt. %, $B_2O_3$ in the range of 5 to 31 wt. %, MgO in the range of 20 to 50 wt. %, CaO in the range of 0 to 20 wt. %, BaO in the range of 0 to 50 wt. %, $La_2O_3$ in the range of 0 to 40 wt. %, $P_2O_5$ in the range of 0 to 5 wt. %, and $MO_2$ in the range of 0 to 5 wt. %, where M is one element selected from the group consisting of Zr, Ti and Sn.

29. A pressure sensor according to claim 26, wherein the partially devitrified enamel composition comprises $SiO_2$ in the range of 7–33 wt. %, $B_2O_3$ in the range of 5 to 31 wt. %, MgO in the range of 20 to 50 wt. %, CaO in the range of 0 to 20 wt. %, BaO in the range of 0 to 50 wt. %, $La_2O_3$ in the range of 0 to 40 wt. %, $P_2O_5$ in the range of 0 to 5 wt. %, and $MO_2$ in the range of 0 to 5 wt. %, where M is one element selected from the group consisting of Zr, Ti and Sn.

* * * * *

UNITED STATES PATENT AND TRADEMARK OFFICE
CERTIFICATE OF CORRECTION

PATENT NO. : 5,406,852
DATED : April 18, 1995
INVENTOR(S) : Hiraka et al

It is certified that error appears in the above-identified patent and that said Letters Patent is hereby corrected as shown below:

IN THE TITLE:

Change "DRYER" to --LAYER--.

Signed and Sealed this

Third Day of October, 1995

Attest:

BRUCE LEHMAN

*Attesting Officer*     *Commissioner of Patents and Trademarks*